US006914243B2

(12) United States Patent
Sheehan et al.

(10) Patent No.: US 6,914,243 B2
(45) Date of Patent: Jul. 5, 2005

(54) ION ENRICHMENT APERTURE ARRAYS

(76) Inventors: Edward W. Sheehan, Chem-Space, 635 William Pitt Way, Pittsburgh, PA (US) 15238; Ross C. Willoughby, Chem-Space, 635 William Pitt Way, Pittsburgh, PA (US) 15238

( * ) Notice: Subject to any disclaimer, the term of this patent is extended or adjusted under 35 U.S.C. 154(b) by 0 days.

(21) Appl. No.: 10/863,130

(22) Filed: Jun. 7, 2004

(65) Prior Publication Data

US 2004/0245458 A1 Dec. 9, 2004

Related U.S. Application Data

(60) Provisional application No. 60/476,582, filed on Jun. 7, 2003.

(51) Int. Cl.[7] ........................... B01D 59/44; H01J 49/00

(52) U.S. Cl. ....................... 250/288; 250/281; 250/286; 250/294; 250/283

(58) Field of Search ................................ 250/283, 294, 250/288, 398, 281, 286

(56) References Cited

U.S. PATENT DOCUMENTS 6,744,041 B2 * 6/2004 Sheehan et al. ............ 250/294
6,818,889 B1 * 11/2004 Sheehan et al. ............ 250/288
2002/0011560 A1 * 1/2002 Sheehan et al. ............ 250/283

* cited by examiner

*Primary Examiner*—Nikita Wells
*Assistant Examiner*—Johnnie L Smith, II
(74) *Attorney, Agent, or Firm*—Levisohn, Berger & Langsam, LLP

(57) ABSTRACT

Improvements have been made for collecting, focusing, and directing of ions and/or charged particles generated at atmospheric or near atmospheric pressure sources, such as but not limited to, electrospray; atmospheric pressure discharge ionization, chemical ionization, photoionization, and matrix assisted laser desorption ionization; and inductively coupled plasma ionization. A multiple-aperture laminated structure is place at the interface of two pressure regions. Electric fields geometries and strengths across the laminated structure and diameters of the apertures; all of which act to optimize the transfer of the ions from the higher pressure region into the lower pressure region while reducing the gas-load on the lower pressure region. Embodiments of this invention are methods and devices for improving sensitivity of mass spectrometry when coupled to atmospheric, near atmospheric, or higher pressure ionization sources by reducing the gas-load on the vacuum system.

28 Claims, 12 Drawing Sheets

ION ENRICHMENT APERTURE ARRAYS

CROSS-REFERENCE TO RELATED APPLICATIONS

This application is entitled to the benefit of Provisional Patent Application Ser. No. 60/476,582, filed Jun. 7, 2003. This application is related to Provisional Patent Application Ser. No. 60/210,677, filed Jun. 9, 2000, and patent application Ser. No. 09/877,167, filed Jun. 8, 2001, now U.S. Pat. No. 6,744,041, issued Jun. 1, 2004; Provisional Patent Application Ser. No. 60/293,648, filed May 26, 2001, now patent application Ser. No. 10/155,151, filed May 25, 2002; Provisional Patent Application Ser. No. 60/384,869, filed Jun. 1, 2002, now patent application Ser. No. 10/499,147, filed May 31, 2003; Provisional Patent Application Ser. No. 60/410,653, filed Sep. 13, 2002, now patent application Ser. No. 10/661,842, filed Sep. 12, 2003; Provisional Patent Application Ser. No. 60/419,699, filed Oct. 18, 2002, now patent application Ser. No. 10/688,021, filed Oct. 17, 2003; and Provisional Patent Application Ser. No. 60/476,576, filed Jun. 7, 2003. Each of the above identified related applications are incorporated herein by reference.

FEDERALLY FUNDED RESEARCH

The invention described herein was made with the United States Government support under Grant Number: 1 R43 RR143396-1 from the Department of Health and Human Services. The U.S. Government may have certain rights to this invention.

BACKGROUND OF THE INVENTION

1. Field of Invention

The present invention is intended to transmit ions from higher to lower pressure regions such as atmospheric pressure interfacing of ionization source to vacuum mass spectrometry or ion mobility spectrometry.

2. Description of Prior Art

Dispersive sources of ions at or near atmospheric pressure; such as, atmospheric pressure discharge ionization, chemical ionization, photoionization, or matrix assisted laser desorption ionization, and electrospray ionization generally have low sampling efficiency through conductance or transmission apertures, where less than 1% [often less than 1 ion in 10,000] of the ion current emanating from the ion source make it into the lower pressure regions of the present commercial interfaces for mass spectrometry.

Fenn, et al. (1985) U.S. Pat. No. 4,542,293 demonstrated the utility of utilizing a dielectric capillary to transport gas-phase ions from atmospheric pressure to low pressure where the viscous forces within a capillary push the ions against a potential gradient. This technology has the significant benefit of allowing grounded needles with electrospray sources. Unfortunately, this mainstream commercial technology transmits only a fraction of a percent of typical atmospheric pressure generated ions into the vacuum. The majority of ions being lost at the inlet due to dispersive fields dominating the motions of ions (FIG. 8). The requirement of capacitive charging of the tube for stable transmission, as well as, transmission being highly dependent on surface charging creates limitations on efficiencies with this technology. Contamination from condensation, ion deposition, and particulate materials can change the surface properties and the transmission. Because of the large surface area contained on the inner wall surface, a large amount of energy is stored and can discharge and damage the electrode surfaces. Care must also be taken to keep the outer surfaces clean and unobstructed, presumably in order not to deplete the image current that flows on the outer surface of the dielectric.

Chowdhury, et al. (1990) U.S. Pat. No. 4,977,320 demonstrated the use of heated metal capillaries to both generate and transmit ions into the vacuum. The efficiencies of this device are low as well. This technology samples both ions and charged droplets into the capillary where, with the addition of heat, ion desorption is facilitated. Undergoing coulomb explosions inside of a restricted volume of the tube will tend to cause dispersion losses to walls with this technique. In addition, this technique encounters the same limitation from dispersion losses at the inlet as the dielectric capillaries.

Lin and Sunner (1994) (J. American Society of Mass Spectrometry, Vol. 5, Number 10, pp. 873–885, October 1994) study a variety of effects on transmission through tubes of glass, metal, and Teflon. A wide variety of parameters were studied including capillary length, gas throughput, capillary diameter, and ion residence time. Effects from space charge, diffusion, gas flow, turbulence, spacing, and temperature where evaluated. These studies failed to identify the field dispersion at the inlet as the major loss mechanism for ions in capillaries. Some important insights where reported with respect to general transmission characteristics of capillary inlets.

Franzen (1998) U.S. Pat. No. 5,736,740 proposes the use of weakly conducting inner surfaces to prevent charge accumulation as a means to facilitate the focusing of ions toward the axis of the capillary. Although it is difficult to distinguish this art from Fenn in that the glass tubes utilized in commercial applications under Fenn also utilize weakly conducting dielectric surfaces, Franzen does argue effectively for the need to control the inner surface properties and the internal electric fields. This device will suffer from the same limitations as Fenn.

Franzen (1998) U.S. Pat. No. 5,747,799 also proposes for the need to focus ions at the inlet of capillaries and apertures in order enhance collection efficiencies. In this device the ions are said to be entrained into the flow by viscous friction. This invention fails to account for the dominance of the electric field on the motion of ions in the entrance region. At typical flow velocities at the entrance of tubes or apertures, the electric fields will dominate the ion motion and the ions that are not near the capillary axis will tend to disperse and be lost on the walls of the capillary or aperture inlet. With this device, a higher ion population can be presented to the conductance opening at the expense of higher field ratios and higher dispersion losses inside the tube.

Forssmann, et al. (2002) WO 03/010794 A2 utilizes funnel optics in front of an electrospray source in order to concentrate ions on an axis of flow by imposing focusing electrodes of higher electrical potential than the bottom of the so called accelerator device. This device frankly will not work. The ions formed by the electrospray process will be repelled by this optics configuration and little to no transmission will occur. Most of the inertial energy acquired by the ions in the source region is lost to collisions with neutral gas molecules at atmospheric pressure; consequently the only energy driving the ions in the direction of the conductance aperture will be the gas flow which under normal gas flows would be insufficient to push the ions up a field gradient. This device does not operate in fully developed flow as will be described in the present invention.

Fischer, et al. (2002) U.S. Pat. No. 6,359,275 B1 address the issue of charging of the inner surface of the capillary by coating the inner surface with a conductor in the dispersive region of the tube while still keeping the benefits of the dielectric tube transport in the nondispersive region of the capillary. This approach addresses the problem of charge accumulation, but it does not remove the significant losses due to dispersion at the inlet.

Fischer, et al. (2002) U.S. Pat. No. 6,486,469 B1 utilizes external electrodes and butted capillary tubes to provide enhanced control of the electric field within the capillary. This device does not address issues related to inlet losses as presented in FIG. 1. In addition, the device still required significantly large dielectric surfaces with the associated problems with charging, contamination, and discharge.

Fischer, et al. (2003) U.S. Patent Application US 2003/003452 A1 and Fischer, et al. (2003) U.S. Pat. No. 6,583,407 B1 utilized a variety of modifications to their dielectric tube device to enhance selectivity and control of ions as they traverse their capillary device. None of these modifications addresses the aforementioned limitations of these capillary devices.

U.S. Pat. No. 6,455,846 B1 to Prior et al. (2002) discloses a flared or horn inlet for introducing ions from an atmospheric ionization chamber into the vacuum chamber of a mass spectrometer. They also reported that the increase in ion current recorded in the mass spectrometer was directly proportional to the increase in the opening of the flared inlet.

U.S. Pat. No. 6,583,408 B2 to Smith et al. (2003) has recently utilized multi-capillary arrays as an inlet to their ion funnel technology. This device reports an advantage of bundle tubes over single opening conductance pathways, but fails to address the major issue relating to ion transmission loss, namely field dispersion of ions at the entrance of the conductance opening. A bundle of tubes without controlled field throughout the conductance path will still have significant losses when sampling higher field sources.

Ion movement at higher pressures is not governed by the ion-optical laws used to describe the movement of ions at lower pressures. At lower pressures, the mass of the ions and the influence of inertia on their movement play a prominent role. While at higher pressures the migration of ions in an electrical field is constantly impeded by collisions with the gas molecules. In essence at atmospheric pressure there is so many collisions that the ions have no "memory" of previous collisions and the initial energy of the ion is "forgotten". Their movement is determined by the direction of the electrical field lines and the viscous flow of gases. At low viscous gas flow, the ions follow the electric field lines, while at higher viscous gas flow the movement is in the direction of the gas flow. Inventors have disclosed various means of moving ions at atmospheric pressure by shaping the electric field lines and directing the flow of gases. FIG. 8 is a simulation of ion trajectories under forces of both electric field and flow. Experimental evidence and theory support the premise that the electric field dominated the motion of ions in the entrance region of most high field sources where ions are focused at the conductance aperture.

Our co-pending U.S. Patent Application 60/419,699 (2003) describes the use of laminated tubes an apertures to control both field and flow in the entire conductance pathway from the entrance to the exit. Delaying dispersion until flow has fully developed is described in this patent as a technique to minimize dispersion losses within the conductance pathway. FIG. 9 illustrates the typical flow development within a laminar flow tube. FIG. 10 illustrates the lack of dispersion when laminated tubes are utilized to maintain uniform field throughout the tube. The principals and methods of this patent are applied to the present invention where our laminated arrays operate with the same ion transmission advantage as observed with laminate tubes. Components of this invention are included by reference into the present invention.

BACKGROUND OF THE INVENTION—OBJECTS AND ADVANTAGES

The objective of the present invention is to maximize the transmission of ions from one pressure regime into an adjacent lower pressure region through an array of apertures in a laminated lens while minimizing the conductance of gas from the higher pressure into the lower pressure region. The relatively uniform electrostatic field through the laminated lens assures high transmission and low dispersion of the ions while in the conductance pathways of the lens. This condition does not exist in present-day ion conductance pathways in atmospheric or high pressure interfaces for mass spectrometers and will result in significantly higher ion transmission through conductance paths compared to the current art.

An important advantage of the device is the operation at lower gas loads into the lower pressure regions while maintaining the transmission of ions. This has beneficial implications including lower requirements for pumping, power, and general size. Conversely, this device has higher transmission of ions for a given total gas load on the lower pressure region resulting in more sensitive response for ion analyzers or higher currents for current deposition processes. Utilizing small apertures in the arrays results in very low electrostatic field penetration into the lower pressure region relative to larger apertures with higher conductance.

Another important advantage of the present device is the decrease in contamination from sample deposition along the conductance path and the associated reduction in required maintenance, system drift, charging, and potential carryover from sample to sample due to deposition.

An important object of the present invention is the use of matched ion optics to the conductance pattern. The macroscopic lenses can be patterned to focus the ions to a microscopic compressed pattern of conductance opening. In other words, with patterned arrays we can focus the ions to an exact pattern of conductance openings rather than being required to focus to a single opening of a tube or aperture.

Another important advantage of conductance arrays is the ability to measure the transmission of ions in discrete packets, each representative of a portion of the delivered cross-section from a source of ions. With this capability we are able to independent measure each pathway to discern the cross-section composition of a source of ions. This increased information content adds a enhance dimension to analysis where composition across a cross-section may provide diagnostic, feedback, or analytical information.

It is the objective of this invention to facilitate higher transmission of ions from any number of pressure regimes, including above atmospheric pressure, atmospheric pressure, and intermediate pressures. There may be practical uses of this approach even in the millitorr region, although inertial components of motion and scattering will begin to degrade performance below about one torr.

The device is intended to be used for transmission of ions from higher pressure ion sources to lower pressure destinations. Examples of ionization sources operating at high pressures would be atmospheric pressure or intermediate pressure sources, such as electrospray (ES), atmospheric pressure chemical (APCI) and photoionization (APPI), inductively coupled plasmas (ICP), and MALDI (both atmospheric pressure and reduced pressures). Examples of lower pressure destinations would be ion analyzers such as mass spectrometers or ion mobility spectrometers, and surfaces in vacuum where the deposition of thin films and etching processes are preformed.

SUMMARY

In accordance with the present invention an ion enrichment aperture comprises a laminated lens comprised of alternate layers of insulators and metal laminates, having a plurality of openings in a prescribed pattern establishing an interface between two pressure regions.

DRAWINGS—FIGURES

Figure 7:
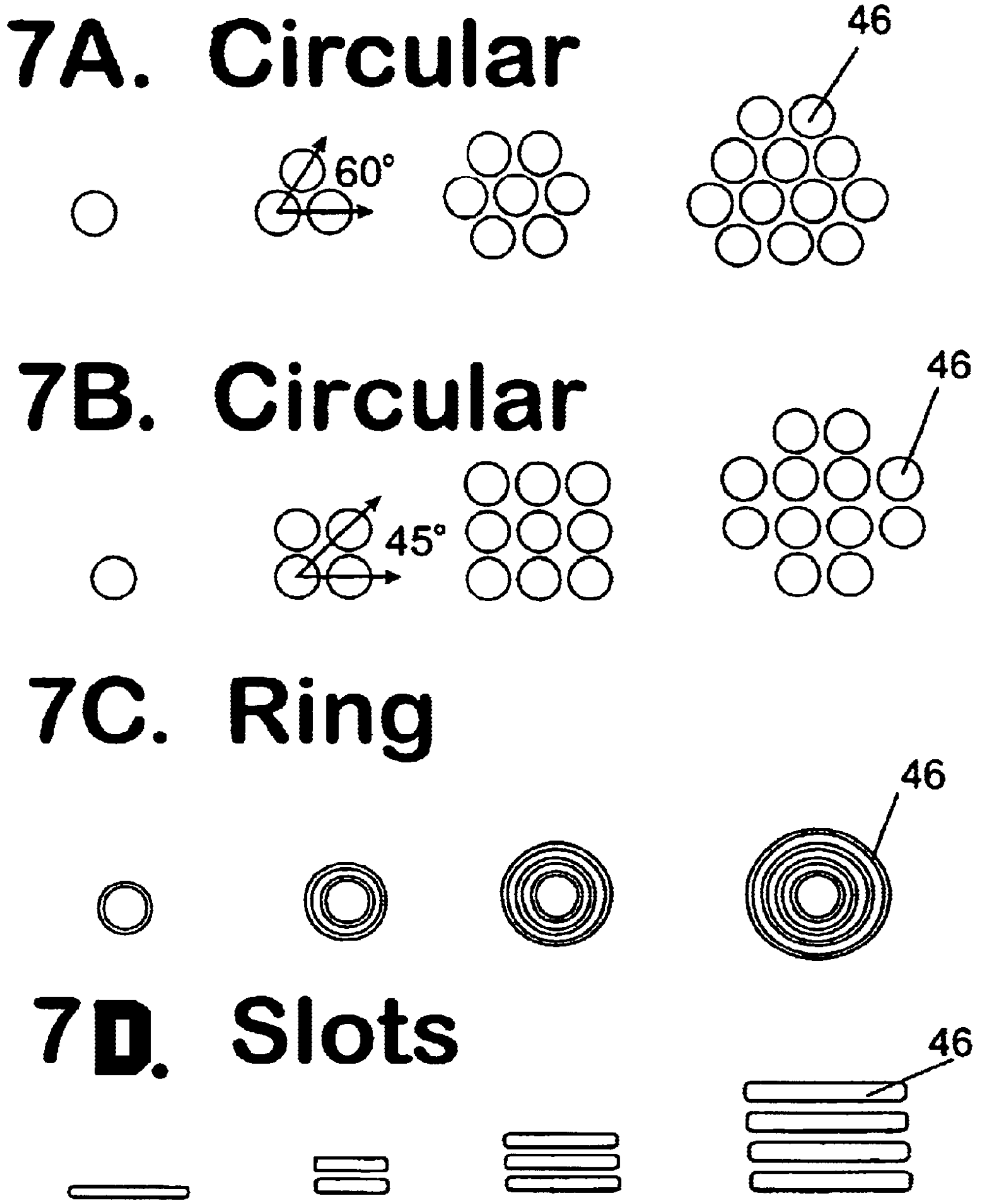

FIG. 7 shows a variety of conductance aperture arrays or patterns that may be implemented onto various embodiments of the device: A. Circular apertures with 60 degree relative orientation, B. Circular apertures with 45 degree relative orientation, C. Co-centric ring arrays, and D. Linear slotted aperture arrays.

Figure 8:
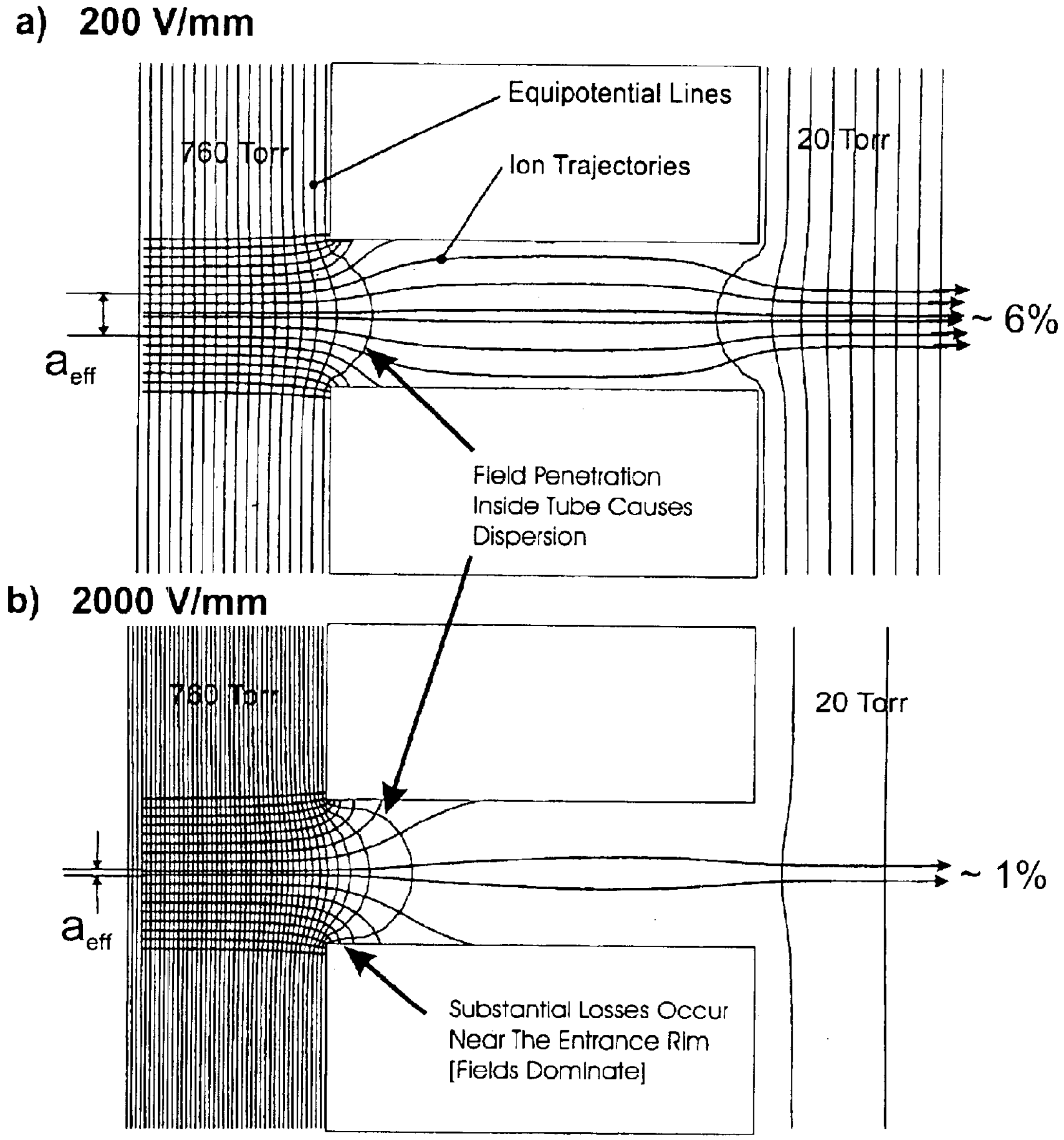

FIG. 8 shows simulated trajectories of ions showing significant dispersion at the entrance of the field-free conductance tube when entering from a (a) 200V/mm source and a (b) 2000V/mm source region. ($a_{eff}$ is the effective aperture diameter of the tube and is much smaller than the actual tube diameter for the higher field sources shown)

Figure 9:
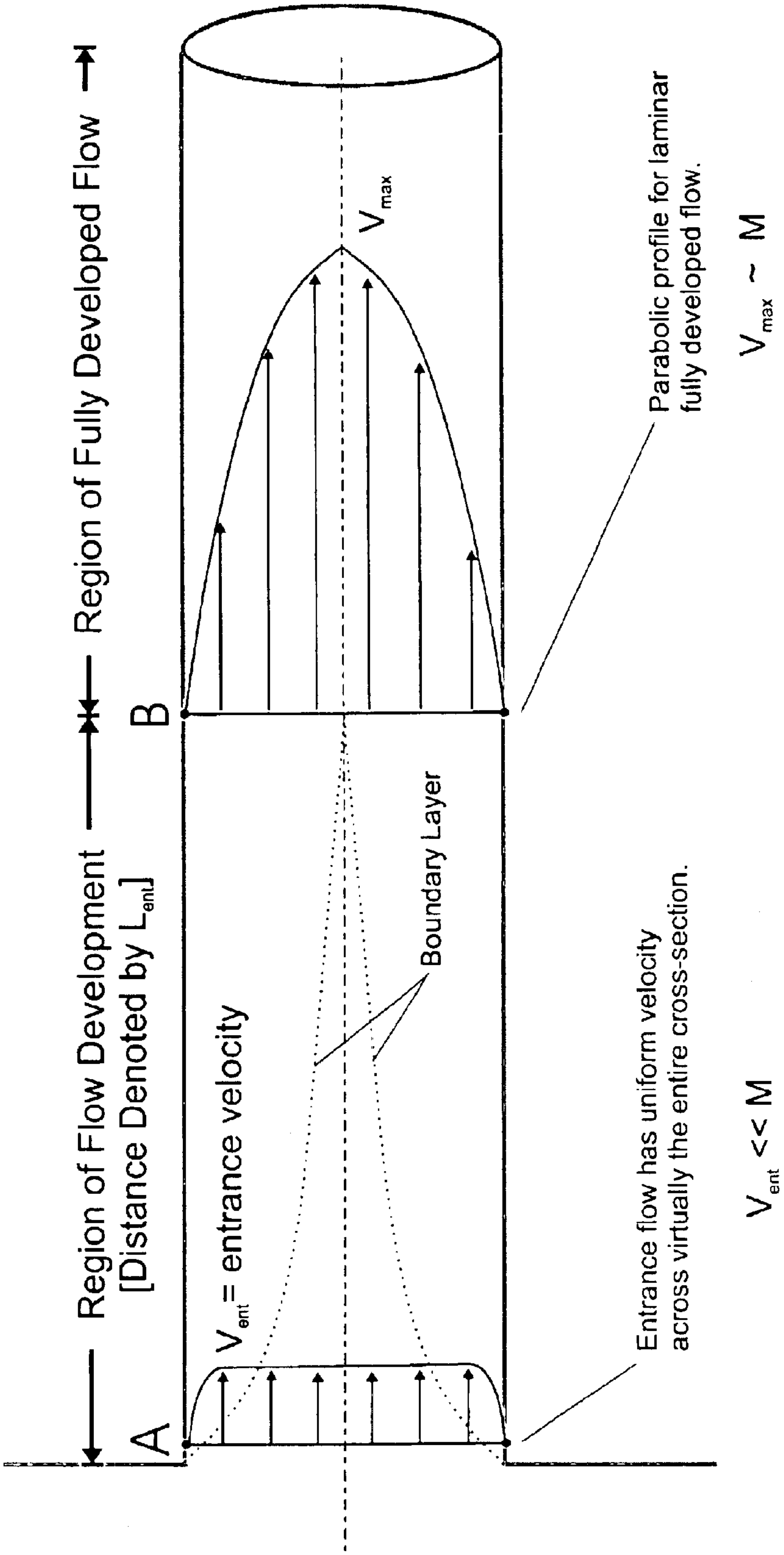

FIG. 9 shows the flow development in a laminar flow tube with planar flow at the tube entrance developing into the classic parabolic velocity profile farther down the tube. At the entrance to most atmospheric pressure tube inlets, the field will dominate the motion and ions are lost to the walls of the tube.

Figure 10:
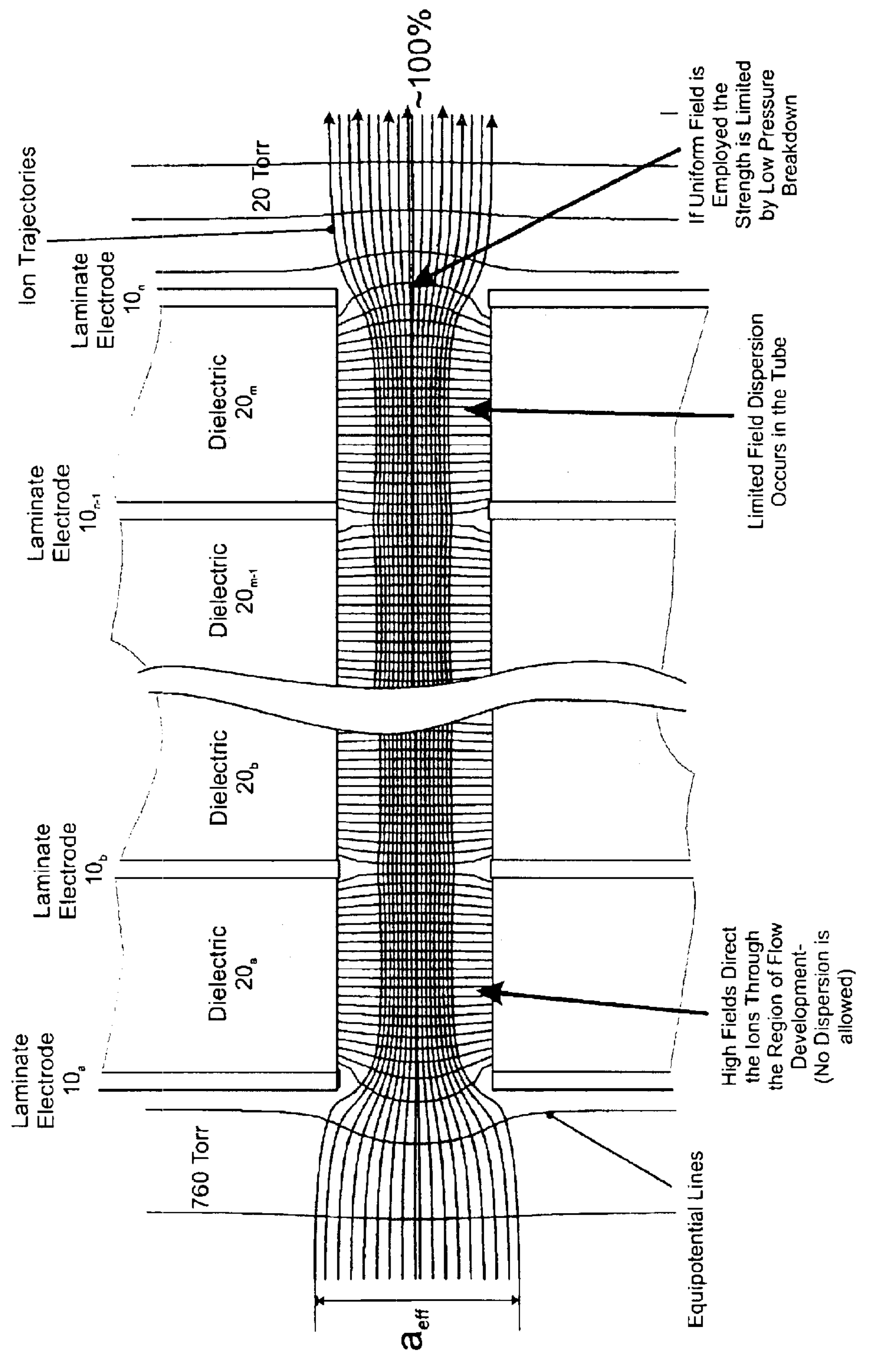

FIG. 10 shows the trajectories of ions traveling through a laminated tube with uniform field through out the tube and not dispersion losses within the tube.

DRAWINGS—REFERENCE NUMBERS

10 ion trajectories
12 equipotential lines
14 ion beams
16 translational stage
20 equipotential lines
30 ion source region
32 higher pressure region
40 first metal laminate
42 voltage supply or supplies
44 first insulator laminate
46 conductance apertures
48 second metal laminate
50 higher pressure region
52 second insulator laminate
54 third metal laminate
60 chamber wall
62 O-ring
70 ion destination region
72 ion collector detector
74 multi-detector array
80 funnel region
82 high transmission element (HTE)
83 HTE apertures
84 funnel lens
85 funnel lens aperture
90 deep well region

DETAILED DESCRIPTION—FIGS. 1 AND 2—PREFERRED EMBODIMENT

Figure 1:
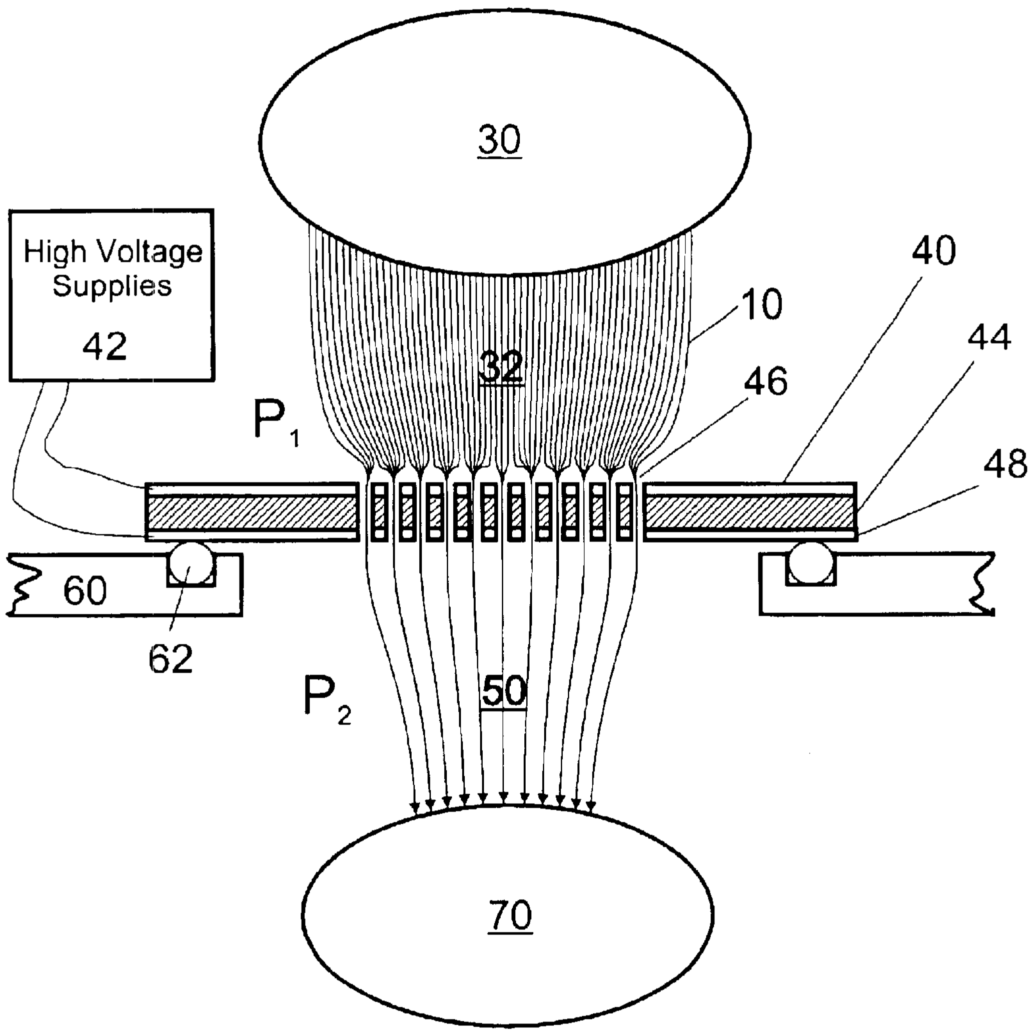
FIG. 1 shows a cross sectional view of an ion selective multi-aperture laminate according to the present invention with metal lamination on both sides.
Figure 2:
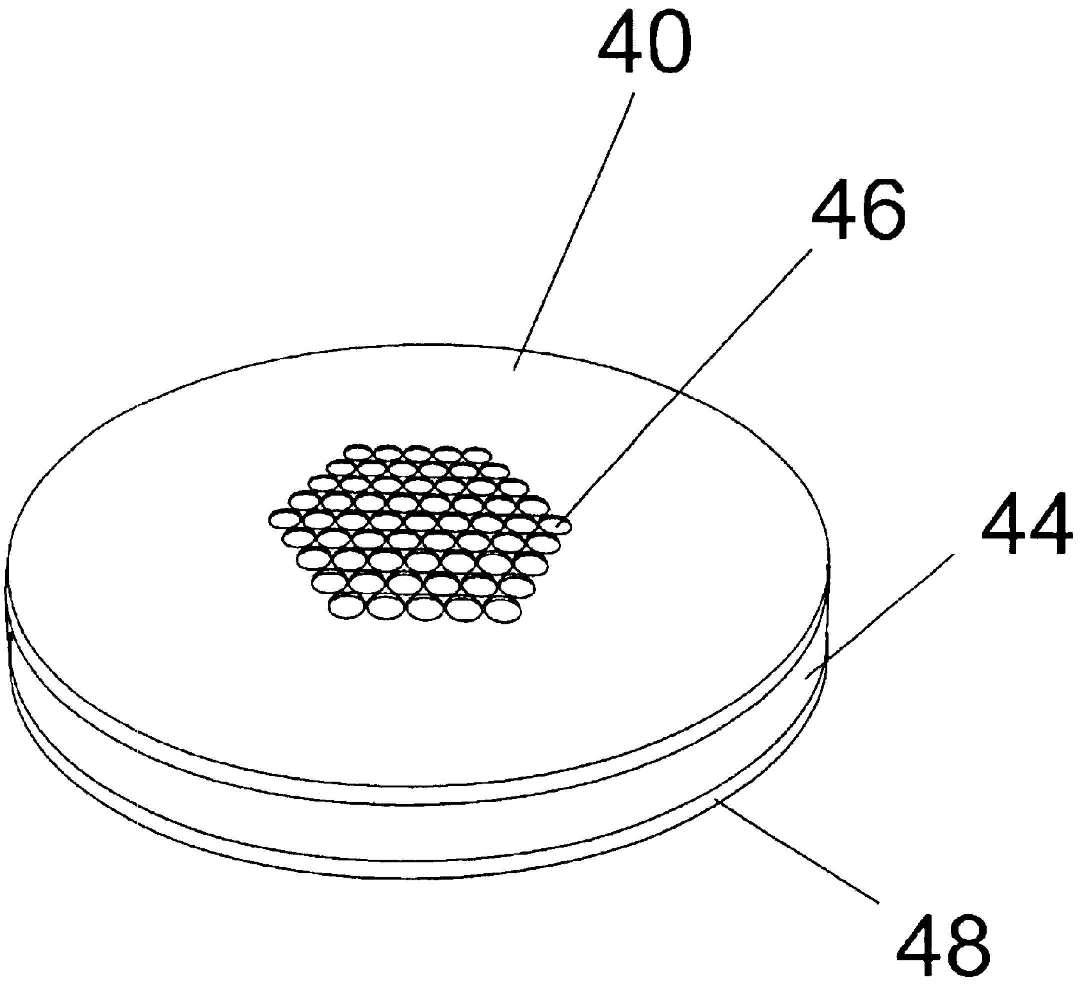
FIG. 2 shows an ion selective multi-aperture laminate disk with a metal laminate on both sides of a center insulator and circular shaped apertures.

A preferred embodiment of the ion selective multi-aperture laminate of the present invention is illustrated in FIGS. 1 and 2. The multi-aperture laminate has a thin first insulated laminate 44 of uniform cross section consisting of an insulating material. A layer of metal 40 and 48 is laminated on both sides of the laminate 44. In the preferred embodiment, 44 is an insulating material, such as glass or ceramic. However, it can consist of any other material that can isolate electrically the two metal laminates 40 and 48 from each other, such as nylon, polyimide, Teflon, poly ether ether ketone (PEEK), etc.

The multi-aperture lens is populated with many holes or apertures 46 that traverse the lens leading from higher pressure ion collection region 32 to lower pressure region 50. The inlets of the apertures 46 are downstream of the ion source region 30 and ion collection region 32. The inlets accept ions from the region 32. The ions are transfer to the outlet of the apertures 46 and exit into the lower pressure region 50 and are collected in destination region 70.

The multi-aperture laminates rest on an O-ring 62 which isolate the metal surface 48 from the chamber wall 60. In the preferred embodiment, the wall is the vacuum chamber of a gas-phase ion detector, such as, but not limited to a mass spectrometer. The O-ring also serves as a vacuum seal. The wall is made of an insulating material, such as, polyimide or glass. However, the wall can consist of any material that can contain a low pressure, such as, nylon, polycarbonate, ploy ether ether ketone (PEEK), stainless steel, aluminum, etc.

The metal laminates may be deposited on the base by vapor deposition and the holes or apertures formed by ablating away the metal and base using a laser. Alternatively the multi-aperture lens may be manufactured by using the techniques of microelectronics fabrication: photolithography for creating patterns, etching for removing material, and deposition for coating the surfaces with specific materials.

The multi-aperture laminate is typically 1 mm to 3 mm in thickness, and has overall dimensions roughly 30 mm×30 mm (square shape) to a diameter of roughly 30 mm (circular shaped). The apertures of the lens are circular in shape as shown in FIG. 2. In other embodiments, the apertures can be but not limited to rectangular or oblong shapes. FIGS. 7A through D show a variety or proposed conductance aperture array patterns that can be oriented to provide high collection and low relative conductance. The simplest laminate is a single aperture. We can increase the number of apertures and decrease the diameter of individual holes in order to reduce overall conductance. The smaller the aperture size, the higher the demand on and requirement for micro-fabrication techniques. Precise tolerances on laminate structures and apertures can be obtained into the sub-micron dimensions. In general, the smaller the apertures the lower the gas conductance with resulting higher ion flux across the lens.

Figure 3:
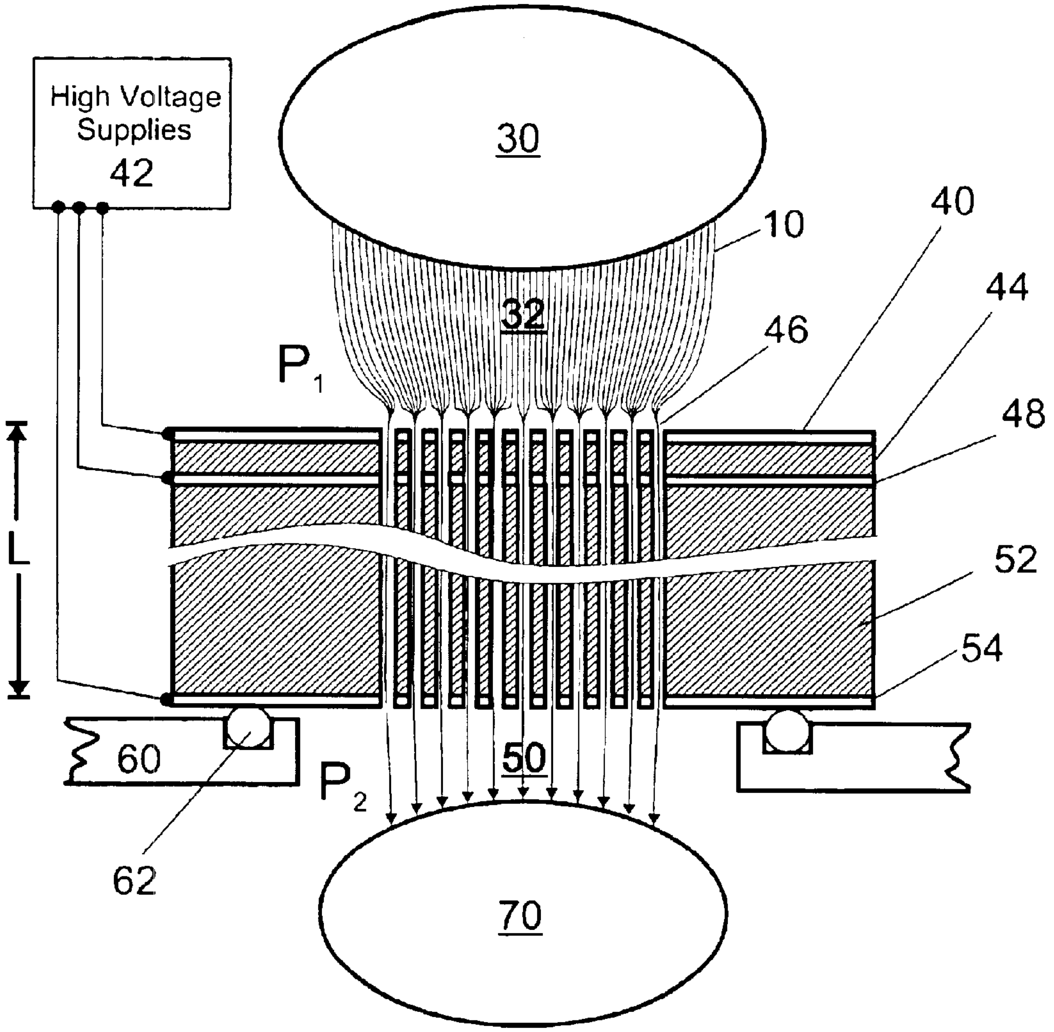
FIG. 3 shows a cross sectional view of an ion selective multi-aperture device with an additional laminate of metal downstream to allow for the establishment of tubular rather than aperture gas flow conditions.

FIGS. 3—Additional Embodiments

There are various possibilities with regard to the number and type of laminates that can make up the laminated multi-aperture lens. FIG. 3 shows a cross-sectional view of multi-aperture lens made up of numerous laminates. Besides the insulating base 44 and metal laminates 40 and 48, an additional insulating layer 52 is laminated onto the exposed surface of the metal laminate 48 while a third metal layer 54 is laminated onto this second insulating laminate. Alternatively, the laminated multi-aperture lens can be configured without the third metal laminate. This increased length of the conductance apertures in this embodiment results in different conductance properties (tube vs. pinhole) which has advantages for some applications (L is the length of the conductance tube).

Figure 5A:
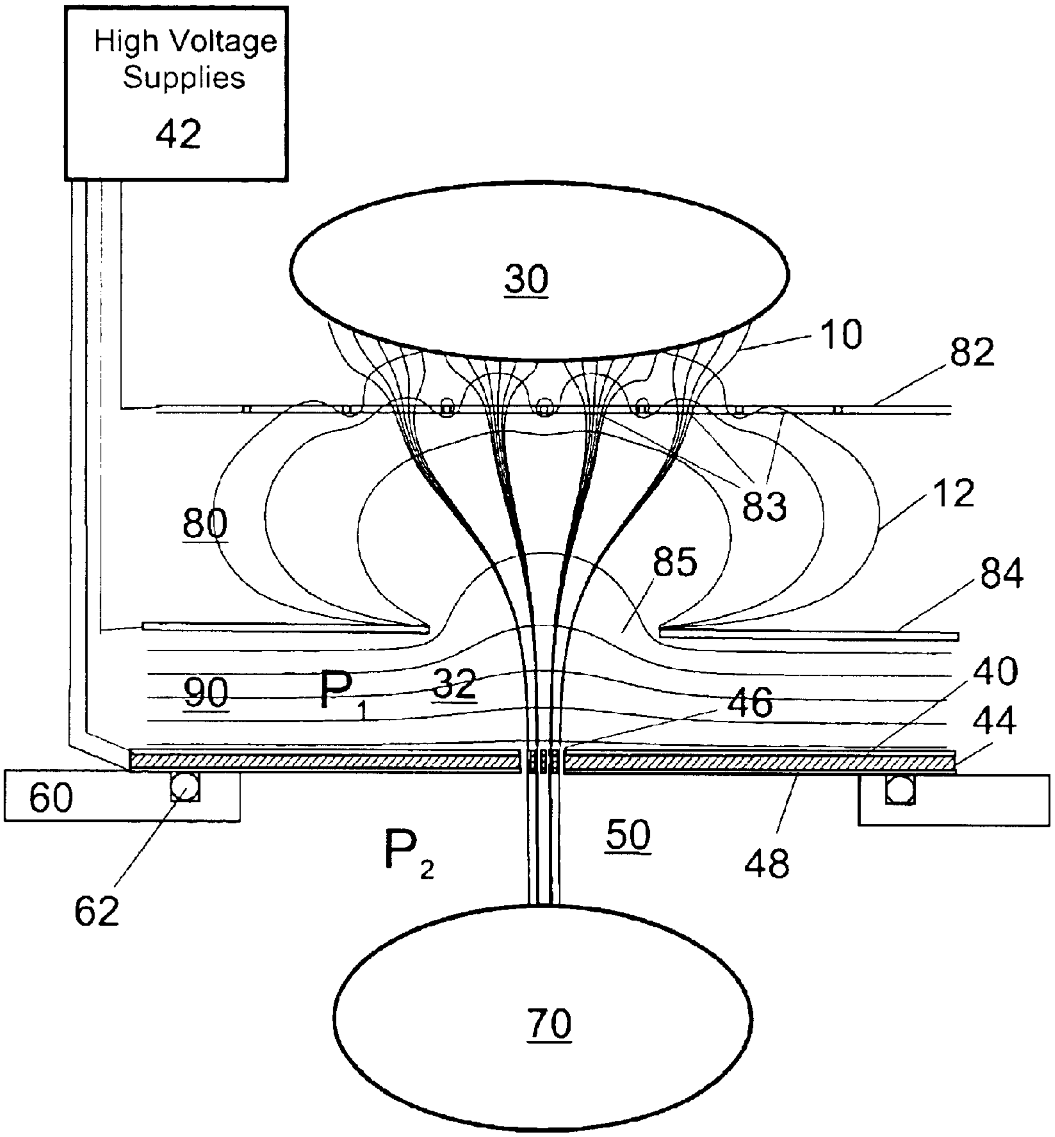
FIG. 5A shows a cross sectional view of a multi-aperture device with the compression of the ions into ion beams occurring remotely from the conductance aperture. In this embodiment there is an additional ion optical compression of the ion beam onto a smaller array of conductance apertures.
Figure 5B:
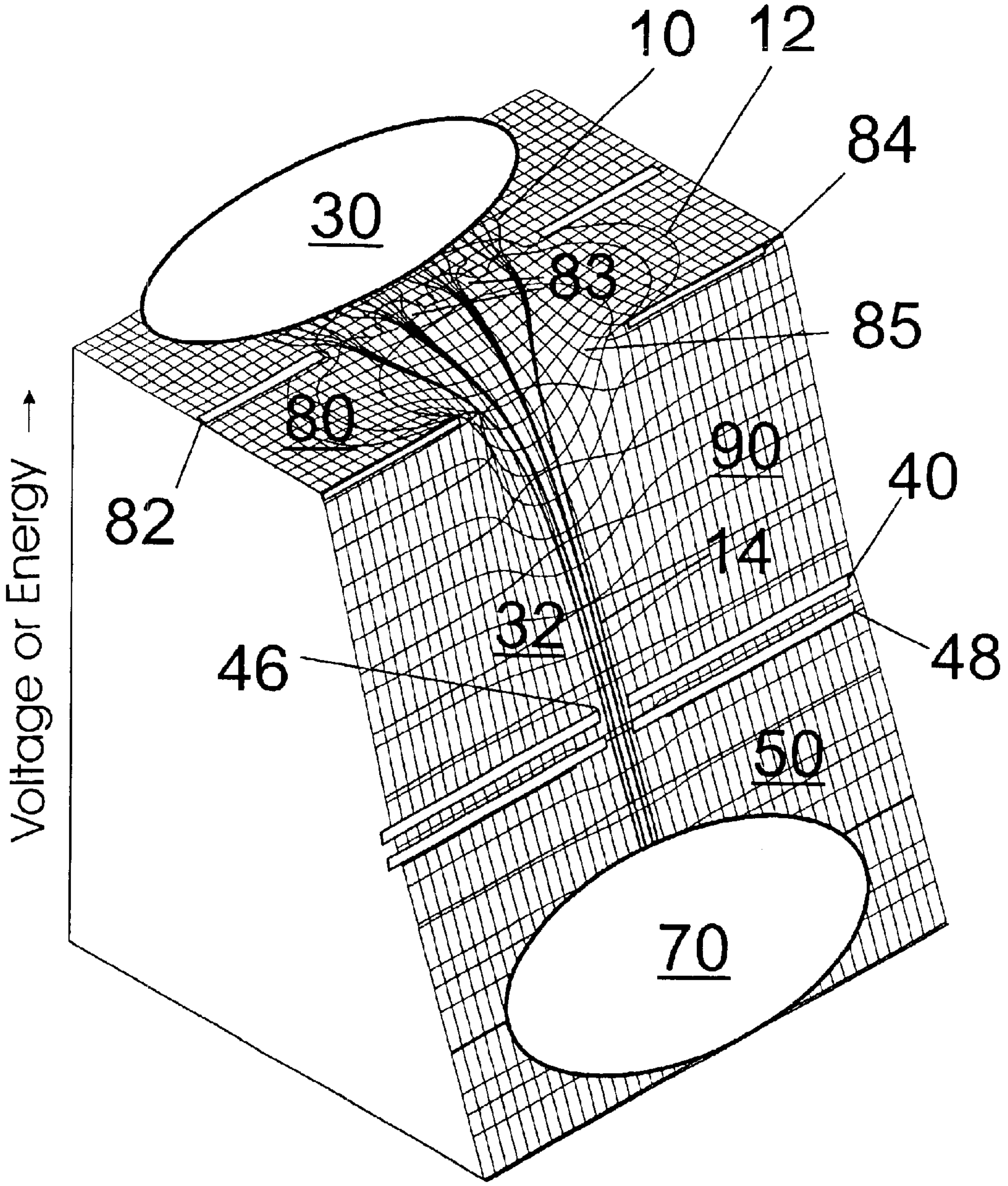
FIG. 5B shows a potential surface of the device shown in FIG. 5A.
Figure 6:
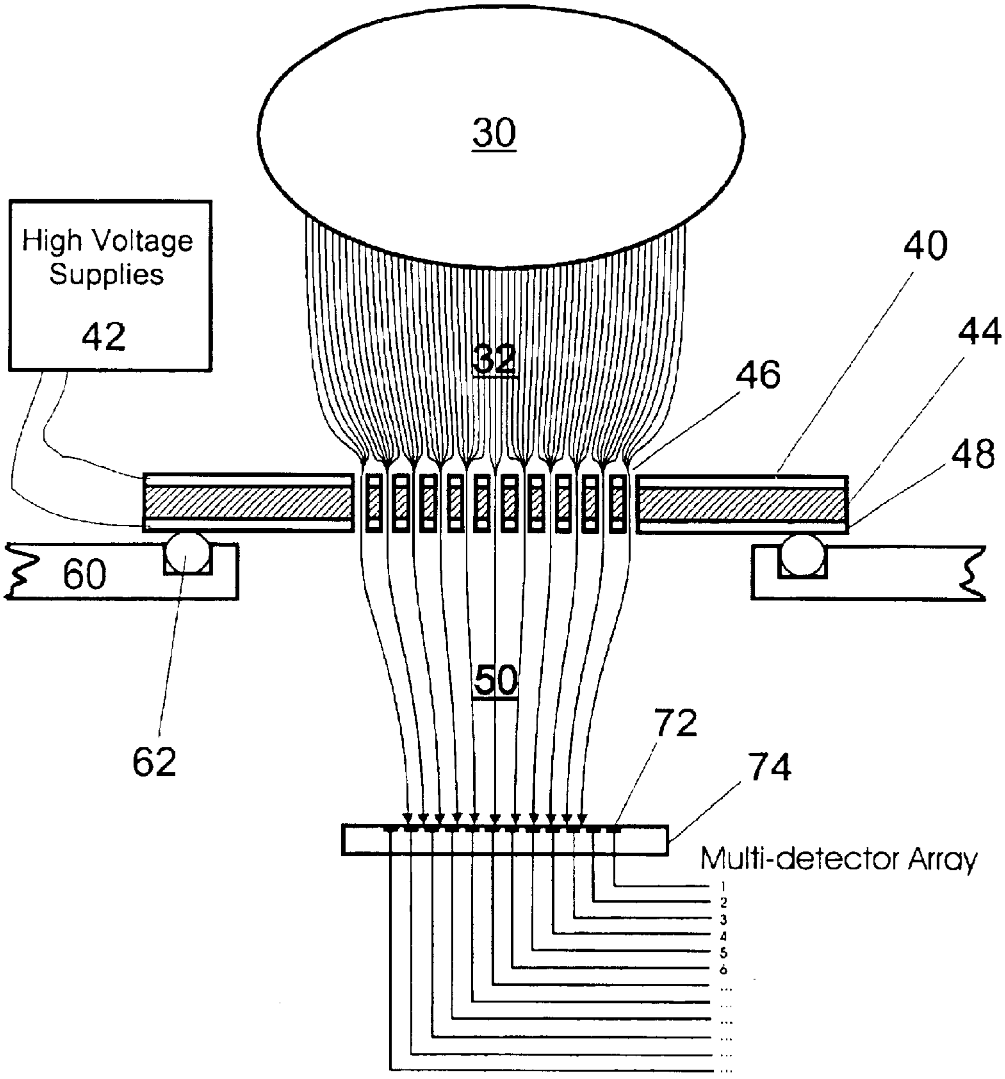
FIG. 6 shows a similar cross sectional view of a multi-aperture lens directing ions onto a multi-detector array.

FIGS. 4, 5, 6—Additional Embodiments

Figure 4A:
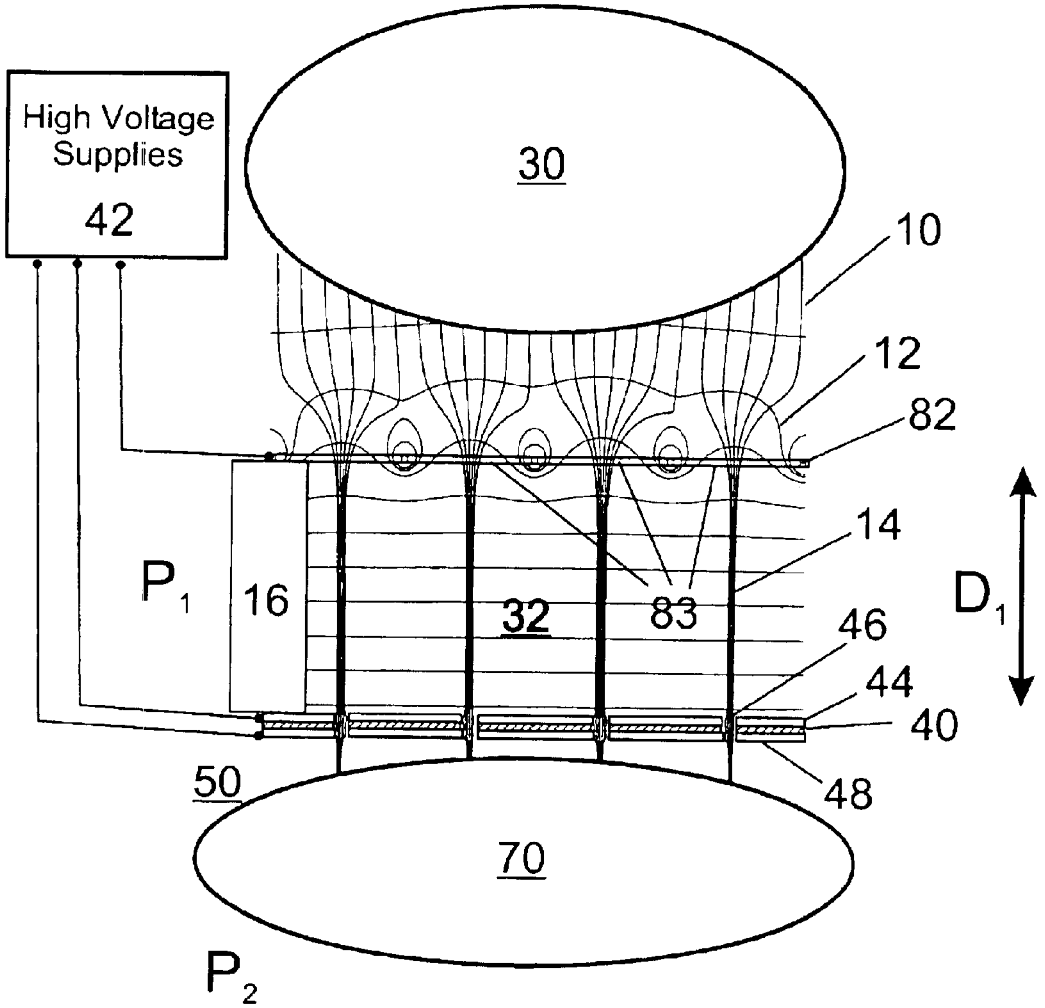
FIG. 4A shows a cross sectional view of a multi-aperture device with the compression of the ions into ion beams occurring remotely from the conductance aperture.

One additional embodiment seen in FIG. 4A introduces an additional high transmission surface 82 which is a patterned and perforated metal element that allows the compression of ions to occur remotely from the conductance apertures 46 (destined by $D_1$, distance between surface 82 and metal laminate 40). Because the compression of a dispersed ion population from region 30 occurs some distance away from the conductance apertures, mechanical alignment may be required to line the beams with the apertures. One method would be electro-mechanical translational stages 16.

Another additional embodiment seen in FIG. 5A introduces an additional high transmission surface 82 (at a distance of $D_2$) and an additional funnel lens 84 to allow further compression of the patterned ion beams into a smaller cross section bundles of ion beams that are directed at a smaller more condensed patterned arrays of conductance apertures. The patterned ion beams can be exactly matched to the patterned arrays of conductance apertures to maximize ion transmission through a minimum conductance cross-section.

An additional embodiment is shown in FIG. 6; a cross sectional view of the ion selective multi-aperture lens is shown. FIG. 6 shows an arrangement as in FIG. 1, however the multi-aperture lens is positioned upstream of a multi-detector array 74, individual ion streams 56 exiting the apertures 46 can be focused onto discrete collector electrodes 72, these discrete collectors being electrodes in a micro-channel plate or a multi-anode as described in U.S. Pat. No. 5,777,326 to Rockwood et al. (1998). In other embodiments, the laminated multi-aperture lens can serve as a means of introducing ions at or near atmospheric pressure into a mass spectrometer equipped with a high pressure interface for the introduction of ions into the mass analyzer.

Operation—FIGS. 1, 2

The manner of using the multi-aperture laminate to introduce ions from atmospheric pressure ion sources (API), such as but not limited to, electrospray, atmospheric pressure chemical ionization, or inductively coupled plasma ion sources into a vacuum system is as follows. Ions at or near atmospheric pressure in the ion source region 30 are directed towards the metal surface 40 along the lines of the electrical force fields. Near the metal surface the ions are focused into the inlets of the apertures 46 by following the electrical force fields emanating outward toward the ion source region 30. At the same time they are entrained for the most part by the gas also entering the inlets of the apertures from region 32 and transferred through the aperture into the low-pressure region 50 and collected in region 70 (as shown in FIG. 1). Through suitable potentials at the ion source region 30, metal surfaces 40 and 48, and region 70, the electrical force fields are formed. For positive ions, typically the metal laminate 40 is at ground potential while the electrical potential of the metal laminate 48 is selected to cause the electrical field lines emanating from the apertures to be converging into the inlet of the apertures. Region 70 is at a lower potential relative to metal laminate 48. The exact potentials will depend on the thickness of the base 44, the metal laminates 40 and 48; and the diameters of the apertures. The conditions for ion transmission are that the electric fields inside of the conductance pathway between the metal laminates must be substantially higher than the electric field in the collection region 32. Under these conditions, ions will compress into the cross section of the apertures 46 from the entire incident surface of ions. Another important condition of operation is that the electric field within the conductance pathway (i.e. between the inlet and outlet of 46) must be fairly uniform to prevent ions entering the aperture from dispersing to the walls of the opening. This will result in charging of surface. Ions are swept through the conductance pathway without appreciable radial dispersion by either electric field or viscous flow.

It should also be noted that the operation of these ion selective aperture array may occur across any number of pressure differentials, including, but not limited to atmospheric pressure (AP) to first pumping stage in mass spec; above AP to AP for high pressure applications; and first pumping stage (~10 Torr) to second stage (~0.1 Torr) in a differentially pumped vacuum system. One important operating boundary will be the discharge limit associated with any given pressure regime. Obviously, we are limited to lower electrostatic field strengths for compression when operation at the minimum of the Paschen Curve.

It is generally anticipated that the relative pressure between region 32 and region 50 are at least a factor of two although, factors of 10 or more can be obtained with increased pumping (with vacuum destinations) or increased pressure source with above atmospheric pressure sources.

Operation of Additional Embodiments—FIG. 3

The aperture length L of the present device may be increased by the addition of insulated laminate 52 and addition metal laminate 54. The conductance pathway in this device is operated under the conditions of tube flow which decreases the conductance for a given cross sectional area of the collective apertures 46.

In general, the operation of the embodiment illustrated in FIG. 3 is the same as FIG. 1 with the downhill (in terms of electrostatic field) flow of ions from source 30 into collection region 32. The electrostatic field penetration from inside the laminate apertures 46 reaches out and focusses ions from region 32 into the laminate apertures 46.

It is anticipated that the electrostatic field down the entire length of L should be kept fairly uniform under normal operation. Slightly dispersive fields may be overcome with the viscous flow within the tube as described in our co-pending patent (U.S. Patent Application 60/419,699).

Operation of Additional Embodiments—FIGS. 4, 5, 6

Figure 4B:
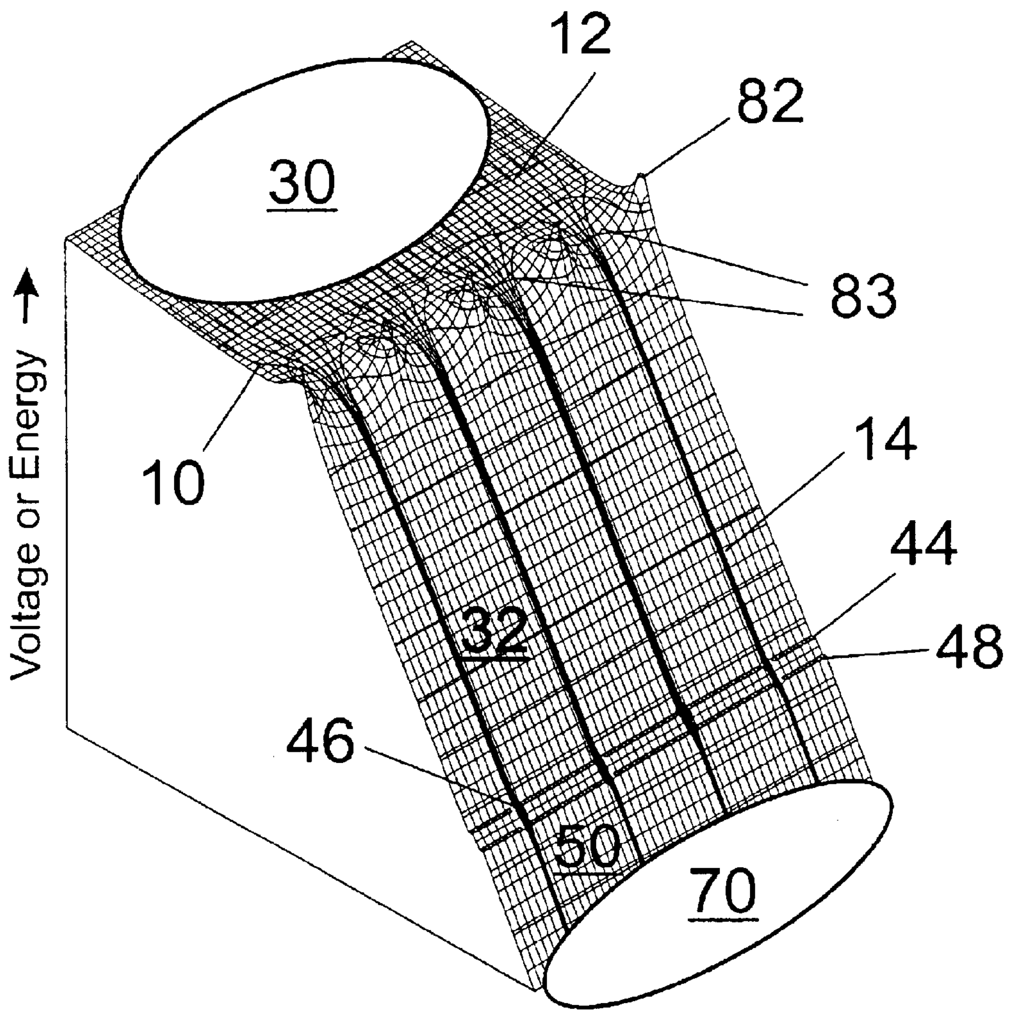
FIG. 4B shows a potential surface of the device shown in FIG. 4A.

FIGS. 4A and 4B are operated in a different mode compared to previous embodiments in that the ion compression occurs remotely (distance D1) from the pressure reduction. The addition of a high transmission element 82 with arrays of openings 83 upstream from the conductance laminate openings 46 results in the compression of the ion population from source 30 into collimated ion beams 14 due to a significant field ratio across element 82. The beams 14 traverse region 32 toward the laminated surface in relative straight lines due to the uniform field in region 32.

Key to operation of this embodiment is the precise alignment of the ion beams 14 with the conductance apertures 46 in the laminated surface. We envision that this alignment requires that the apertures 83 be aligned electro-optically with aperture 46. This can be accomplished with high precision assembly or x-y translational stages 16. These can be controlled and manipulated with verniers or stepper motors. Detectors (as illustrated in FIG. 6) can also be used to measure optimal current in the low pressure region and computer data collection, feedback, and control can be implemented.

FIG. 4B illustrates the potential surface that the ions traverse traveling from region 30 to region 70. Note that the relative voltages applied to metal elements 82, 44, and 48, as well as the destination 70 potential are adjusted so that field is fairly uniform the entire distance from the high transmission element 82 to the ion destination 70. One important operational limitation is the electrostatic discharge or breakdown of gases, particularly at lower pressures. Also note the penetration of the electric field across element 82. Some details of operation of an array of apertures 82 of this type are described in U.S. patent application Ser. Nos. 09/877,167 and 60/384,869, both to Sheehan and Willoughby.

In some implementations of the present device, some dispersion will be tolerated at the low pressure side. Such as, when the destination region is the entrance of a radio frequency (RF) ion guide. When the ions are introduced into the entrance of the RF ion guide they would be refocused on-axis by means of collisional damping in the pseudo-potential well of the ion guide.

FIGS. 5A and 5B are operated in a different mode compared to previous embodiments in that the ion compression occurs remotely (distance $D_2$) from the pressure reduction. The addition of a high transmission element 82 with arrays of openings 83 upstream from the conductance laminate openings 46 results in the compression of the ion population from source 30 into collimated ion beams 14 due to a significant field ratio across element 82. In this embodiment the ion beams 14 traverse region 90 through the funnel lens aperture 85 toward the laminated surface in curved trajectories due to the funnel shaped electrostatic fields in funnel region 80 established by funnel lens 84. Resulting in further focusing the aggregate of ion beams onto a smaller cross-sectional area at the array of apertures 46 on the laminated surface.

As with FIGS. 4 the key to operation of this embodiment is the precise alignment of the ion beams 14 with the conductance apertures 46 in the laminated surface. We envision that this alignment requires that the apertures 83 be lined up electro-optically with aperture 46. This can also be accomplished with high precision assembly or x-y translational stages 16 or feedback control coupled with ion detectors. Note that alignment with this "double focusing" device will require more precision both spatially and electro-optically.

FIG. 5B illustrates the potential surface that the ions traverse traveling from region 30 to region 70. Note that the relative voltages applied to metal elements 82, 84, 44, and 48, as well as the destination 70 potential are adjusted so that field is fairly uniform the entire distance from the high transmission element 82 to the ion destination 70. One important operational caution is the restriction of the discharge or breakdown, particularly at lower pressures. Note the focusing fields of the funnel region 80 coupled to the deep well region 90.

In some implementations of the present device, some dispersion will be tolerated at the low pressure side as outline in FIG. 4 with RF ion guides. Alternatively, region 70 may be an intermediate pressure reduction stage containing a skimmer as part of electrostatic lens elements to focus and collect ions exiting the apertures 46 of the multi-aperture lens into region 50.

As shown in FIG. 6, when the metal laminated multi-aperture lens is positioned in front of a multi-detector array 74, individual ion streams 56 exiting the outlets of the apertures can be collected at discrete collector electrodes 72, such as but not limited to, micro-channel arrays or multi-anodes as described in U.S. Pat. No. 5,77,326 to Rockwood et al. (1998).

Conclusion, Ramifications, and Scope

Accordingly, the reader will see that the ion enrichment aperture arrays of this invention can be used to introduce gas-phase ions and charged particles into lower pressure regions, such as the vacuum chamber of a mass spectrometer, without imparting large gas loads on the vacuum system; can be used to accept and pass into a lower pressure region an incident ion beam with a prescribed pattern; and can be used to sample an ion beam of whose cross-section is many times the cross section of the individual openings of the ion enrichment aperture. In addition, when an ion enrichment aperture array is used in conjunction with our high transmission lens, laminated or unlaminated, dispersive plasma of gas-phase ions and charged particles can be sampled and introduced into lower pressure regions without imparting a large gas load on the vacuum system. Furthermore, the ion enrichment aperture has the additional advantages in that:

- it permits the production of ion enrichment apertures in a variety of shapes tailor make for a specific ion source;
- it permits the production of ion enrichment apertures with specific number and shape of openings tailor made for maximum ion transmission and minimal gas load on the lower pressure region;
- it allows the sampling of wide incident ion beams, 1–3 mm wide, without the associated gas load that an aperture 1–3 mm wide would impart on the lower pressure region.
- it provides an inlet aperture were the electric fields in front of the aperture are controllable and can be varied depending on type of ion source, ion detector or analyzer in lower pressure region, and pressure across inlet aperture.

Although the description above contain many specifications, these should not be construed as limiting the scope of the invention but as merely providing illustrations of some of the presently preferred embodiments of this invention. For example, the lens can have other shapes, such as circular, oval, triangular, etc.; the openings can have other shapes; insulator and metal laminates can be manufactured by using the techniques of microelectronics fabrication, photolithography for creating patterns, etching for removing material, and deposition for coating the insulating base with specific materials; the number of laminates, the relative thickness of adjacent laminates and the size and shape of the individual openings can vary depending on the source of ions, the type of ion collection region, the pressure drop across the lens or a combination of all three, etc.

Thus the scope of the invention should be determined by the appended claims and their legal equivalents, rather than by the examples given.

What is claimed is:

1. Apparatus for the collection, focusing, and directing of gas-phase ions or charged particles from a higher pressure region into a lower pressure region, the apparatus comprising:

a. a source of ions in said higher pressure region;

b. a laminated interface populated with a plurality of openings forming an barrier between said higher and lower pressure regions through which said ions pass unobstructed, said interface comprising a flat body of insulating material having a layer of metal laminated on both sides, topside and underside, of said body that is contiguous with said body, said metal laminate on the topside of said interface is adjacent to said ion source, said laminates being supplied with individual attracting electric potentials by connection to a voltage supply generating an electrostatic field between said source of ions in said higher pressure region and said interface;

c. a destination in said lower pressure region having a lower electric potential than said interface, said destination is adjacent to said metal laminate on the underside of said lens, for receiving said ions.

2. The apparatus of claim 1 wherein said body of said interface is composed of electrically insulating material, such as but not limited to glass or ceramic.

3. The apparatus of claim 1 wherein said higher pressure region is at or near atmospheric pressure.

4. The apparatus of claim 3 wherein said ion source region at or near atmospheric pressure is comprised of an electrospray, atmospheric pressure chemical ionization, atmospheric laser desorption-ionization, photoionization, discharge ionization, inductively coupled plasma ionization sources, or a combination thereof.

5. The apparatus of claim 1 wherein said higher pressure region is at pressures greater than atmospheric pressure.

6. The apparatus of claim 1 wherein said lower pressure region is greater than 1 torr.

7. The apparatus of claim 1 wherein said source of ions in said higher pressure region is comprised of an incident beam of ions from an array of capillaries, an ion optics assembly, a high-transmission perforated surface, optical lens with electromechanical translational stages, RF multi-pole or multi-plate assemblies, or combinations thereof.

8. The apparatus of claim 1 wherein said destination in said lower pressure region is comprised of an array of capillaries, an ion optics assembly, RF multi-pole or multi-plate assemblies, tesselated ion detector, a mass analyzer, or combinations thereof.

9. The apparatus of claim 1 wherein said laminated interface is populated with openings having a prescribed pattern.

10. Apparatus for the collection, focusing, and directing of gas-phase ions or charged particles at or near atmospheric pressure into a low pressure region, the apparatus comprising:

a. a dispersive source of said gas-phase ions;

b. a laminated interface populated with a plurality of openings having a prescribed pattern through which said ions pass unobstructed, said interface comprising a flat body of insulating material having a layer of metal laminated on the topside and underside of said flat body that is contiguous with said body, said metal laminate on said topside of said interface is adjacent to said ion source, said laminates being supplied with individual attracting electric potentials by connection to a voltage supply, and generating an electrostatic field between said source of ions and said interface;

c. a destination region adjacent to said metal laminate on said underside of said interface having a lower electric potential than said interface; said destination region held at a pressure lower than atmospheric pressure.

11. The apparatus of claim 10 wherein said prescribed pattern of said individual openings are axial symmetric with a corresponding individual detecting components of an array or tessellated detector or corresponding individual openings in an array of openings or capillaries in said destination region, whereby electric field lines between said interface and said detector or array of openings or capillaries cause ions exiting individual openings of said interface to impact on said corresponding individual detecting components or flow into said corresponding individual openings of said array of openings or capillaries.

12. The apparatus of claim 10 wherein said lower pressure region is greater than 1 torr.

13. The apparatus of claim 10 wherein said ion source region at or near atmospheric pressure is comprised of an electrospray, atmospheric pressure chemical ionization, atmospheric laser desorption-ionization, photoionization, discharge ionization, inductively coupled plasma ionization sources, a high-transmission perforated surface, optical lens with electro-mechanical translational stages, or a combination thereof.

14. Apparatus for the collection, focusing, and directing of gas-phase ions or ionic particles from a higher pressure region into a lower pressure region, the apparatus comprising:

a. a source of ions in said higher pressure region;

b. a laminated interface populated with a plurality of openings having a prescribed pattern forming an interface between said higher and lower pressure regions through which said ions pass unobstructed into said lower pressure region, said interface comprising a central electrode having alternating layers of insulating and metal laminates on the topside and underside of said central electrode with said insulating laminate contiguous with said central electrode and said metal laminates, said metal laminate on said topside of said interface is downstream of said source of ions, said central electrode and metal laminates supplied with individual attracting electric potentials by connection to a voltage supply, and generating an electric field between said source of ions in said higher pressure region and said interface;

c. a destination in a lower pressure region having a lower electric potential than said interface, said destination is adjacent to said metal laminate on the underside of said interface, for receiving said ions.

15. The apparatus of claim 14 wherein said central electrode is comprised of individual components which are individually addressable, whereby the electric potential of said individual components may be varied to control the flow of ions through the openings into said lower pressure region.

16. The apparatus of claim 14 wherein said source of ions in said higher pressure region is comprised of an incident beam of ions from an array of capillaries, an ion optics assembly, a high-transmission perforated surface, optical lens with electro-mechanical translational stages, RF multi-pole or multi-plate assemblies, or combinations thereof.

17. The apparatus of claim 14 wherein said higher pressure region is at or near atmospheric pressure.

18. The apparatus of claim 17 wherein said ion source region at or near atmospheric pressure is comprised of an electrospray, atmospheric pressure chemical ionization, atmospheric laser desorption-ionization, photoionization, discharge ionization, inductively coupled plasma ionization sources, or a combination thereof.

19. The apparatus of claim 14 wherein said destination in said lower pressure region is comprised of an array of capillaries, an ion optics assembly, RF multi-pole or multi-plate assemblies, tesselated ion detector, a mass analyzer, or combinations thereof.

20. Method for the transfer of charged particles or ions or combination thereof from an ion source at or near atmospheric pressure and focusing approximately all said charged particles or ions into a lower pressure region, the method comprising:

a. providing electric urging to said ions from said ion source with electric fields provided by a laminated interface of the type comprising alternating layers of insulating and metal laminates having metal laminates on topside and underside of said interface, said interface populated with openings having a prescribed pattern that are contiguous with said laminates, said metal laminates having ion drawing electric potentials such that electric field lines between said ion source and said laminated interface are concentrated into said openings;

b. providing electric urging from said lower pressure region and viscous flow to said ions as they exit said openings such that both electric field and viscous or stream flow lines are directed into lower pressure region;

whereby approximately all said ions are transferred from said ion source at or near atmospheric pressure into said lower pressure region through said openings for ion detection, ion mobility or mass spectral analysis, or combination thereof.

21. The method of claim 20 wherein providing the transfer of said ions at or near atmospheric pressure into lower pressure region, said laminated interface is comprised of an insulating base, said insulating base is sandwiched between and is contiguous with said metal laminates on topside and underside of said interface, said metal laminate on said topside is downstream of said ions source at or near atmospheric pressure, while said metal laminate on said underside is upstream or contiguous with lower pressure region, whereby approximately all said ions are transferred or not transferred through said openings into lower pressure region by adjusting electrostatic urging, direct current (DC), of said central metal laminate.

22. The method of claim 20 wherein providing the transfer of said ions at or near atmospheric pressure into lower pressure region, said laminated interface is comprised of a central metal layer or laminate having a topside and underside, said central metal laminate has a layer of insulating material laminated on said topside and underside of said central metal laminate that are contiguous with said central metal laminate, in addition said insulating laminates are contiguous with said metal laminates on topside and underside of said interface, whereby a substantial fraction of said ions are transferred or not through said openings into lower pressure region by adjusting said electric urging, direct current (DC), varying current (RF), or a combination thereof, of said central metal laminate.

23. Method for increasing the conductance of charged particles or ions or combination thereof from a high pressure ion source through a series of parallel openings into a lower pressure region, the method comprising:

a. providing a electric urging to said ions from said ion source with electric fields provided by a laminated interface of the type comprising alternating layers of insulating and metal laminates having metal laminates on topside and underside of said interface, said interface populated with a prescribed pattern of said parallel openings contiguous with said laminates, said metal laminates having ion drawing electric potentials such that electric field lines between said ion source and said laminated interface are concentrated into said openings;

b. providing electric urging from said lower pressure region and concurrent viscous flow to said ions as they exit said openings into lower pressure region such that both electric field and viscous or stream flow lines are directed into said lower pressure region;

c. maintaining said lower pressure region at or near atmospheric pressure but not less than 1 torr;

whereby approximately all said ions are transferred from said high pressure ion source into said lower pressure region while limiting the conductance of gas from said high pressure source through said openings into lower pressure region.

24. The method of claim 23 wherein said lower pressure region is comprised of ion optic assemblies, RF multi-pole or multi-plate assemblies, an ion mobility or mass spectrometer, or combination thereof.

25. Method for accepting the trajectories of ions and charged particles or combination, the method comprising:

a. providing a high pressure ion source of the type comprising an array of openings or capillaries;

b. providing a electric urging to said ions from said ion source with electric fields provided by a laminated interface of the type comprising alternating layers of insulating and metal laminates having metal laminates on topside and underside of said interface, said interface populated with a prescribed pattern of openings contiguous with said laminates, said prescribed pattern matching the pattern of said array of said ion source, such that electric field lines between said individual openings in said array in said ion source and said laminated lens are concentrated into individual openings in said interface in a prescribed pattern;

c. providing electric urging from said lower pressure region and concurrent viscous flow to said ions as they exit said openings such that both electric filed and viscous or stream flow lines are directed into said lower pressure region;

whereby approximately all said ions in a prescribed pattern are transferred from said high pressure ion source, through said pattern openings in said interface and into said lower pressure region in a prescribed pattern.

26. The method of claim 25 wherein said lower pressure region is comprised of an array of capillaries, an ion optics assembly, RF multi-pole or multi-plate assemblies, tesselated ion detector, an ion mobility or mass analyzer, or combinations thereof.

27. Method for projecting the trajectories of ions and charged particles or combination onto an inlet array of openings or capillaries, the method comprising:

a. providing a high pressure ion source;

b. providing a electric urging to said ions from said ion source with electric fields provided by a laminated interface of the type comprising alternating layers of insulating and metal laminates having metal laminates on topside and underside of said interface, said interface populated with a prescribed pattern of openings contiguous with said laminates, such that electric field lines between said ion source and said laminated interface are concentrated into said prescribed openings in said interface;

c. providing electric urging from said lower pressure region and concurrent viscous flow to said ions as they exit said openings such that both electric field and viscous or stream flow lines are directed into said lower pressure region as a prescribed pattern;

whereby approximately all said ions flow in a prescribed pattern at the individual openings in an inlet array of openings or capillaries.

28. The method of claim 27 wherein said inlet array of openings or capillaries is the inlet to an ion mobility spectrometer, vacuum system of a mass spectrometer, or combination thereof.

* * * * *